United States Patent
Emeis et al.

(10) Patent No.: US 10,241,778 B2
(45) Date of Patent: Mar. 26, 2019

(54) MICROSERVICES VERSION STATE VISUALIZATION

(71) Applicant: CA, Inc., Islandia, NY (US)

(72) Inventors: Mark W. Emeis, Monument, CO (US); Robert C. Hendrich, Colorado Springs, CO (US); Dann M. Church, Castle Rock, CO (US); Craig Andrew Vosburgh, Colorado Springs, CO (US)

(73) Assignee: CA, Inc., Islandia, NY (US)

( * ) Notice: Subject to any disclaimer, the term of this patent is extended or adjusted under 35 U.S.C. 154(b) by 61 days.

(21) Appl. No.: 15/277,269

(22) Filed: Sep. 27, 2016

(65) Prior Publication Data

US 2018/0088925 A1  Mar. 29, 2018

(51) Int. Cl.
  *G06F 8/65* (2018.01)
  *G06F 8/71* (2018.01)
  *G06F 9/451* (2018.01)
  *G06T 11/20* (2006.01)

(52) U.S. Cl.
  CPC ............. *G06F 8/65* (2013.01); *G06F 8/71* (2013.01); *G06F 9/451* (2018.02); *G06T 11/206* (2013.01)

(58) Field of Classification Search
  CPC ... G06F 8/65; G06F 8/71; G06F 9/451; G06T 11/001; G06T 11/206
  USPC ........................................................ 717/170
  See application file for complete search history.

(56) References Cited

U.S. PATENT DOCUMENTS

| | | | | |
|---|---|---|---|---|
| 6,763,403 | B2 * | 7/2004 | Cheng | G06F 8/62 709/200 |
| 8,762,981 | B2 * | 6/2014 | Georgiev | G06F 8/60 717/171 |
| 8,776,043 | B1 * | 7/2014 | Thimsen | H04L 12/6418 717/171 |
| 9,098,366 | B1 * | 8/2015 | Adib | G06F 8/61 |

(Continued)

FOREIGN PATENT DOCUMENTS

BE       1024534 B1 * 4/2018
WO  WO-2016113913 A1 * 7/2016 .............. G06F 11/00

OTHER PUBLICATIONS

Kratzke et al., "A Visualizing Network Benchmark for Microservices", 2016, Scitepress (Year: 2016).*

(Continued)

*Primary Examiner* — Wei Y Zhen
*Assistant Examiner* — Junchun Wu
(74) *Attorney, Agent, or Firm* — Alliance IP, LLC

(57) ABSTRACT

In one embodiment, configuration information for a microservices application is obtained, the microservices application comprising a plurality of microservice containers, and the configuration information comprising version information for each of the plurality of microservice containers. A graphical representation of the microservices application is displayed, wherein the graphical representation of the microservices application comprises a representation of each of the plurality of microservice containers. It is determined, based on the version information, whether each of the plurality of microservice containers is updated or outdated. A graphical indication of an updated microservice container is displayed; a graphical indication of an outdated microservice container is displayed; and a graphical indication of an extent to which the outdated microservice container is out-of-date is displayed.

20 Claims, 10 Drawing Sheets

(56) References Cited

U.S. PATENT DOCUMENTS

| | | | | |
|---|---|---|---|---|
| 9,262,152 | B1* | 2/2016 | Kurian | G06F 8/65 |
| 9,305,018 | B2* | 4/2016 | Dickson | G06F 17/3023 |
| 2004/0103412 | A1* | 5/2004 | Rao | G06F 8/65 |
| | | | | 717/171 |
| 2005/0243345 | A1* | 11/2005 | Foehr | G06F 3/1206 |
| | | | | 358/1.9 |
| 2005/0278583 | A1* | 12/2005 | Lennert | G06F 11/1461 |
| | | | | 714/43 |
| 2008/0295090 | A1* | 11/2008 | Bestle | G06F 8/65 |
| | | | | 717/170 |
| 2010/0107150 | A1* | 4/2010 | Kamada | G06F 8/65 |
| | | | | 717/170 |
| 2010/0186007 | A1* | 7/2010 | Jeong | G06F 8/60 |
| | | | | 717/170 |
| 2011/0113418 | A1* | 5/2011 | McCurdy | G06F 8/68 |
| | | | | 717/170 |
| 2012/0089974 | A1* | 4/2012 | Cho | G06F 8/61 |
| | | | | 717/173 |
| 2012/0109905 | A1* | 5/2012 | Tingstrom | G06F 17/227 |
| | | | | 707/690 |
| 2013/0339983 | A1* | 12/2013 | Dai | G06F 9/4443 |
| | | | | 719/318 |
| 2014/0282480 | A1* | 9/2014 | Matthew | G06F 8/65 |
| | | | | 717/172 |
| 2015/0046915 | A1* | 2/2015 | Oliver | G06F 8/65 |
| | | | | 717/170 |
| 2015/0143355 | A1* | 5/2015 | Tingstrom | G06F 8/65 |
| | | | | 717/170 |
| 2016/0103675 | A1* | 4/2016 | Aabye | H04W 4/001 |
| | | | | 717/170 |
| 2016/0162286 | A1* | 6/2016 | Bankole | G06F 8/71 |
| | | | | 717/170 |
| 2016/0179498 | A1* | 6/2016 | Das | G06F 8/65 |
| | | | | 717/171 |
| 2017/0161053 | A1* | 6/2017 | Hayakawa | G06F 11/00 |
| 2017/0249763 | A1* | 8/2017 | Garvey | G06Q 10/1093 |
| 2017/0322795 | A1* | 11/2017 | DeMaris | G06F 8/65 |
| 2018/0067736 | A1* | 3/2018 | De Zaeytijd | G06F 8/65 |

OTHER PUBLICATIONS

Koskinen, "Microservices and Containers", 2016, Turku University (Year: 2016).*

Gall et al., "Visualizing Software Release Histories—The Use of Color and Third Dimension", Aug. 2002, IEEE (Year: 2002).*

Kula et al., "Visualizing the Evolution of Systems and their Library Dependencies", 2014, IEEE (Year: 2014).*

* cited by examiner

MICROSERVICES VERSION STATE VISUALIZATION

BACKGROUND

The present disclosure relates in general to the field of software development, and more specifically, to version state visualization for software applications.

As software applications become increasingly sophisticated, their complexity also increases, along with the number and variety of underlying components. Developing and maintaining a complex software application may be challenging, as its numerous components must each be developed, configured, tested, and maintained or updated. Moreover, because the various components of the application may be developed by different development teams and/or entities, new versions of each underlying component may be developed independently, and thus the timing and frequency of new version releases may vary for each underlying component of the application. In addition, new versions of the underlying components of the application may or may not be compatible with the application itself, depending on the extent of the changes. Accordingly, ensuring that the components of an application are updated with the latest compatible versions may be challenging.

BRIEF SUMMARY

According to one aspect of the present disclosure, configuration information for a microservices application may be obtained. The microservices application may comprise a plurality of microservice containers, and the configuration information may comprise version information for each of the plurality of microservice containers. A graphical representation of the microservices application may be displayed. The graphical representation of the microservices application may comprise a representation of each of the plurality of microservice containers. It may be determined, based on the version information, whether each of the plurality of microservice containers is updated or outdated. A graphical indication of an updated microservice container may be displayed. A graphical indication of an outdated microservice container may also be displayed. A graphical indication of an extent to which the outdated microservice container is out-of-date may also be displayed.

BRIEF DESCRIPTION OF THE DRAWINGS

Like reference numbers and designations in the various drawings indicate like elements.

DETAILED DESCRIPTION

Figure 1:
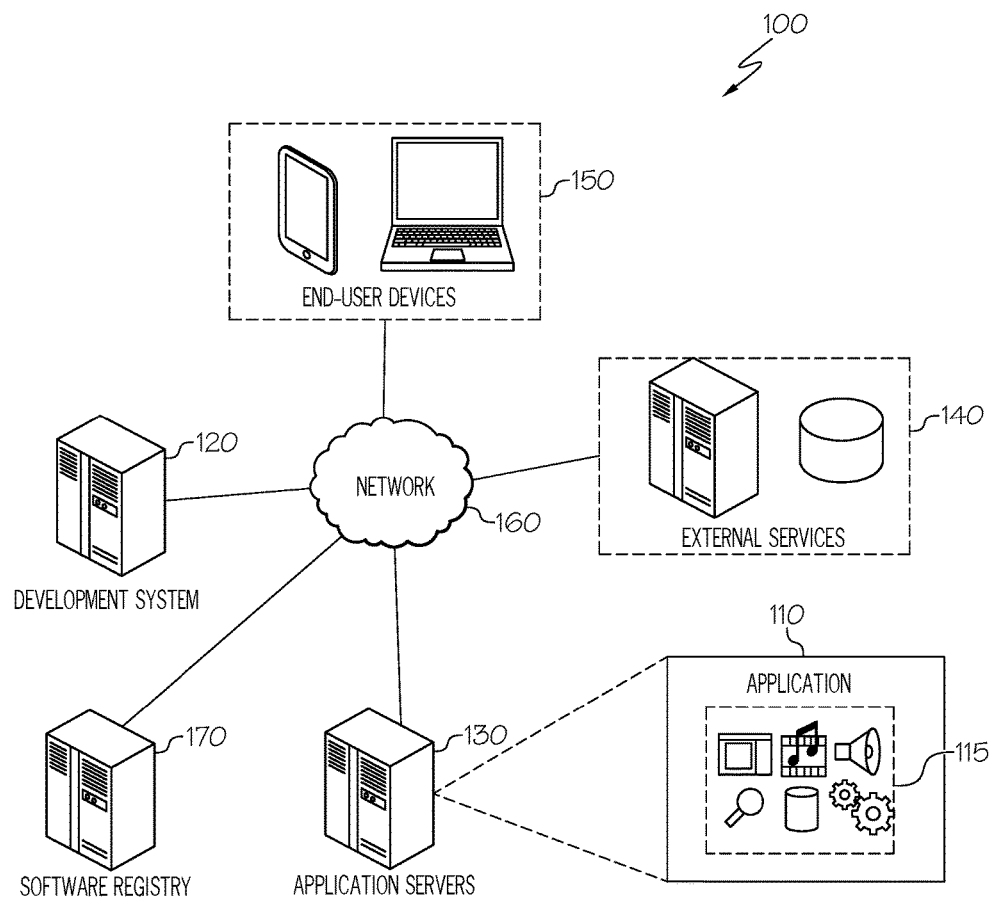
FIG. 1 illustrates a simplified schematic diagram of an example computing environment for software applications.

As will be appreciated by one skilled in the art, aspects of the present disclosure may be illustrated and described herein in any of a number of patentable classes or contexts, including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or as a combination of software and hardware implementations, all of which may generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), or in a cloud computing environment, or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices, to produce a computer implemented process such that the instructions which execute on the computer or other programmable apparatus provide processes for implementing the functions/acts specified in the flowchart and/or block diagram block or blocks.

FIG. 1 illustrates a simplified schematic diagram of an example computing environment 100 for software applications. In some embodiments, computing environment 100 may include version state visualization functionality for software applications, as described throughout this disclosure. The illustrated computing environment 100 includes software application 110, application servers 130, external services 140, software development system 120, and software registry 170, among other hardware and software computing elements. In some implementations, functionality of the various illustrated components, and other associated systems and tools, may be combined or even further divided and implemented among multiple different systems.

Application 110 may be any type of software that is developed and/or hosted in computing environment 100. For example, application 110 may be a software application, program, library, module, or portion of a larger, multi-tiered software system (collectively referred to herein as a software "component"). Application 110 may be developed using software development system 120. In addition, application 110 may be hosted or deployed on one or more application servers 130. Application 110 may be implemented using a monolithic architecture, a microservices architecture, or any other software design approach. A monolithic application may be implemented as a single application that integrates all associated components and functionality. A microservices application may be implemented using multiple separate and self-contained applications, or microservices 115, that each provide a particular service and collectively form a fully functional application. A microservices architecture may allow each underlying microservice 115 of an application 110 to be independently developed, deployed, updated, and scaled, resulting in numerous efficiencies in the software development process. In some cases, an application 110 may also be implemented using software containers (e.g., Docker containers, Open Container Initiative (OCI) based containers, and/or any other software container implementation). Analogous to shipping containers, software containers may package a particular software component with all of its dependencies to ensure that it runs the same in any environment or infrastructure, out-of-the-box. For example, a software container may package everything required to run a particular software component, such as the code, software libraries, configuration, files, runtime environment, and any other associated tools or applications. Software containers may also share a host operating system, thus avoiding the inefficiencies of virtual machines which each require their own guest operating system on top of the host operating system. Microservices applications may be implemented using software containers, for example, by packaging each microservice 115 of an application 110 into separate software containers.

Application servers 130 may host software developed using software development system 120, such as software application 110. Application servers 130 may provide a server environment for running the application 110 and interfacing with its end-users 150. For example, application servers 130 may host web applications for websites, mobile back-ends for mobile applications, databases, and service-based applications (e.g., applications that provide services to other applications), among other examples. Applications 110 hosted on application servers 130 may utilize, consume data and services of, provide data or services to, or otherwise be at least partially dependent on, or function in association with, one or more other software components or applications hosted on the same server system (e.g., application server 130) or a different server system (e.g., external services 140). Applications 110 may be hosted on systems of a single entity or may be distributed among systems controlled by one or more third parties, among other examples.

External services 140 may be third party services used by application 110. For example, external services 140 may be implemented by software components and/or databases hosted by a third party to provide a particular service, such as cloud services, audio and video streaming, messaging, social networking, mapping and navigation, user authentication, payment processing, news, and weather, among other examples. In some embodiments, external services 140 may be hosted by third parties using application servers and/or database servers.

Software development system 120 may facilitate development, testing, deployment, and/or maintenance of software, such as application 110. For example, development system 120 may include tools and functionality for use in the software development cycle, including integrated development environments (IDE), application modeling, configuration, version control, compiling, testing, debugging, deployment, and maintenance, among other examples. Systems and services that facilitate software development (e.g., development system 120 and software registry 170) may be provided local to, or remote from (e.g., over network 160), the end-user devices 150 used by the developers of the software, and/or the target systems used to host the software (e.g., application servers 130 and external services 140).

Software registry 170 may host a repository of software packages that can be used by or used with a particular software application 110, including software libraries or environments, application programming interfaces (APIs), other software applications or components (e.g., database servers, web servers), and operating systems, among other examples. For example, application 110 may rely on a variety of existing software packages, and during development of application 110, development system 120 may obtain the appropriate software packages for building application 110 from software registry 170. Throughout the life of the application 110, development system 120 may also obtain any new versions, releases, updates, patches, bug fixes, or other revisions to those associated software packages. Software packages hosted by software registry 170 may be stored, in some embodiments, using software images corresponding to particular software packages. For example, software packages that are implemented using software containers may be stored in software registry 170 using container images, which may include all components and dependencies required to run a particular software package in a software container. A container image may be a file format used to package the components and dependencies of a containerized software package, such as Docker container images, Open Container Initiative (OCI) based images, and/or any other container image format.

End-user devices 150 may include any type of device that allows a user to interact with the components of computing environment 100. For example, software developers may utilize end-user devices 150 to develop software (e.g., application 110) using software development system 120. As another example, users of a software application 110 may utilize end-user devices 150 to access the application. End-user devices 150 may interact with components of computing environment 100 either locally or remotely over a network 160. For example, in some embodiments, software developers may utilize end-user devices 150 that are local to or integrated with the development system 120, while in other embodiments software developers may utilize end-user devices 150 that interact with the development system 120 over a network 160. End-user devices 150 may include, for example, desktop computers, laptops, tablets, mobile phones or other mobile devices, wearable devices (e.g., smart watches, smart glasses, headsets), smart appliances (e.g., televisions, audio systems, home automation systems, refrigerators, washer/dryer appliances, heat-ventilation-air-conditioning (HVAC) appliances), and the like.

One or more networks 160 may be used to communicatively couple the components of computing environment 100, including, for example, local area networks, wide area networks, public networks, the Internet, cellular networks, Wi-Fi networks, short-range networks (e.g., Bluetooth or ZigBee), and/or any other wired or wireless communication medium. For example, users of application 110 may access the application remotely over a network 160 on application servers 130 using end-user devices 150. As another example, application 110 may utilize external services 140 that are accessed remotely over a network 160. As another example, software developers may access development system 120 remotely over a network 160 using end-user devices 150. As another example, development system 120 may obtain software images remotely over a network 160 from software registry 170.

In general, elements of computing environment 100, such as "systems," "servers," "services," "registries," "devices," "clients," "networks," and any components thereof (e.g., 120, 130, 140, 150, 160, and 170 of FIG. 1), may include electronic computing devices operable to receive, transmit, process, store, or manage data and information associated with computing environment 100. As used in this disclosure, the term "computer," "processor," "processor device," or "processing device" is intended to encompass any suitable processing device. For example, elements shown as single devices within computing environment 100 may be implemented using a plurality of computing devices and processors, such as server pools comprising multiple server computers. Further, any, all, or some of the computing devices may be adapted to execute any operating system, including Linux, other UNIX variants, Microsoft Windows, Windows Server, Mac OS, Apple iOS, Google Android, etc., as well as virtual machines adapted to virtualize execution of a particular operating system, including customized and proprietary operating systems. In addition, any, all, or some of the computing devices may be a software container host adapted to execute software in a containerized environment.

Further, elements of computing environment 100 (e.g., 120, 130, 140, 150, 160, and 170 of FIG. 1) may each include one or more processors, computer-readable memory, and one or more interfaces, among other features and hardware. Servers may include any suitable software component or module, or computing device(s) capable of hosting and/or serving software applications and services, including distributed, enterprise, or cloud-based software applications, data, and services. For instance, in some implementations, development system 120, application servers 130, external services 140, software registry 170, and/or any other sub-system or component of computing environment 100, may be at least partially (or wholly) cloud-implemented, web-based, or distributed for remotely hosting, serving, or otherwise managing data, software services, and applications that interface, coordinate with, depend on, or are used by other components of computing environment 100. In some instances, elements of computing environment 100 (e.g., 120, 130, 140, 150, 160, and 170 of FIG. 1) may be implemented as some combination of components hosted on a common computing system, server, server pool, or cloud computing environment, and that share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

As the complexity of software applications 110 increases, along with the number and variety of underlying components, developing and maintaining these applications 110 may become exceptionally challenging. The numerous components of an application 110 must each be developed, configured, tested, and maintained. Development of an application 110 may involve multiple separate development teams that are each responsible for developing different components. Configuring an application 110 may involve tailored configurations for each component of the application. Testing an application 110 may involve numerous complex tests, using many different test cases and use cases, of both the underlying components individually and the application as a whole. Creating the test cases for testing an application may itself be a complex and time-intensive undertaking.

Maintaining an application 110 may also be challenging, particularly as the number of underlying components increases. For example, a microservices application may include many different microservices 115. Similarly, applications 110 implemented using software containers (such as containerized microservices applications) may include many different container images (e.g., a container image for each microservice 115 of a microservices application). New versions (e.g., new releases, updates, patches, bug fixes, or other revisions) of these underlying software components (e.g., microservices, container images) may be released independently, as they may be developed by different development teams and/or entities. Thus, the timing and frequency of new versions may vary for each software component used by the application 110. In addition, new versions of the software components may or may not be compatible with the application 110, depending on the extent of the changes. Accordingly, ensuring that the software components of an application 110 are updated with the latest compatible versions may be challenging.

In some embodiments, version state visualization functionality may be used to facilitate version management of the underlying components of an application 110. Version state visualization functionality may be provided, for example, by development system 120 and/or end-user devices 150 of software developers. Version state visualization may involve displaying visual indications of the state of each version of the software components of an application 110. The version state information, for example, may indicate whether each software component of an application 110 (e.g., a microservice, microservice container, or other software component or module of an application) is updated or outdated, and the extent to which any outdated software components are out-of-date. For example, the version state information may indicate whether a new version of an outdated software component is a major update (e.g., not backwards compatible), minor update, patch, bug fix, and so forth. The version state information may also indicate whether there are any risks associated with updating an application 110 with a new version of an outdated software package. In some embodiments, the version state information may be derived using semantic versioning and/or checksums, as described further throughout this disclosure. The version state information may be visualized, for example, by displaying graphical or visual indications of the version state of each software component of the application. The version state visualizations may include, for example, thumbs up and thumbs down symbols, check marks and X marks, emoticons or emojis, colors, and/or any other visual indication of the version state of a software component. Any outdated software components of the application 110 may then be updated, as appropriate, by a software developer and/or the development system 120.

In some embodiments, version state visualizations may be implemented by an application modeler. The application modeler, for example, may be functionality provided by the software development system 120. The application modeler may be used to design, configure, and/or update the architecture of a software application 110. For example, an application modeler may be used to design or configure an application 110 by identifying each underlying component, along with its functionality and responsibilities, configuration, version, and relationship to other components, among other information. This configuration information for the application 110 may be created, obtained, stored, and/or displayed using the application modeler. For example, the application modeler may display a graphical representation of the application 110, including a representation of each underlying software component. In some embodiments, the application modeler may also display version state information for the application 110. For example, the application modeler may determine whether each software component of the application 110 is updated or outdated, display indications of the components that are updated or outdated, and/or display indications of the extent that the outdated components are out-of-date. For example, for a microservices application, the application modeler may display a graphical representation of each microservice or microservice container of the microservices application, along with indications of which microservice containers are updated, which microservice containers are outdated, and/or the extent that the outdated microservice containers are out-of-date.

Visually indicating information and risks associated with updating software applications 110 aids developers and support engineers. In addition, using visualizations with widely known and understood meanings, such as emoji icons or emoticons, allows information about software updates to be conveyed more effectively. Moreover, leveraging semantic versioning and/or checksums allows more detailed information about software updates to be ascertained and conveyed. Version state visualizations convey version state information in an easy and quick to understand manner, and may significantly enhance the process of maintaining software applications 110, by simplifying version management, ensuring that applications are timely updated, and minimizing risks associated with updating and/or failing to update applications.

Figure 2A:
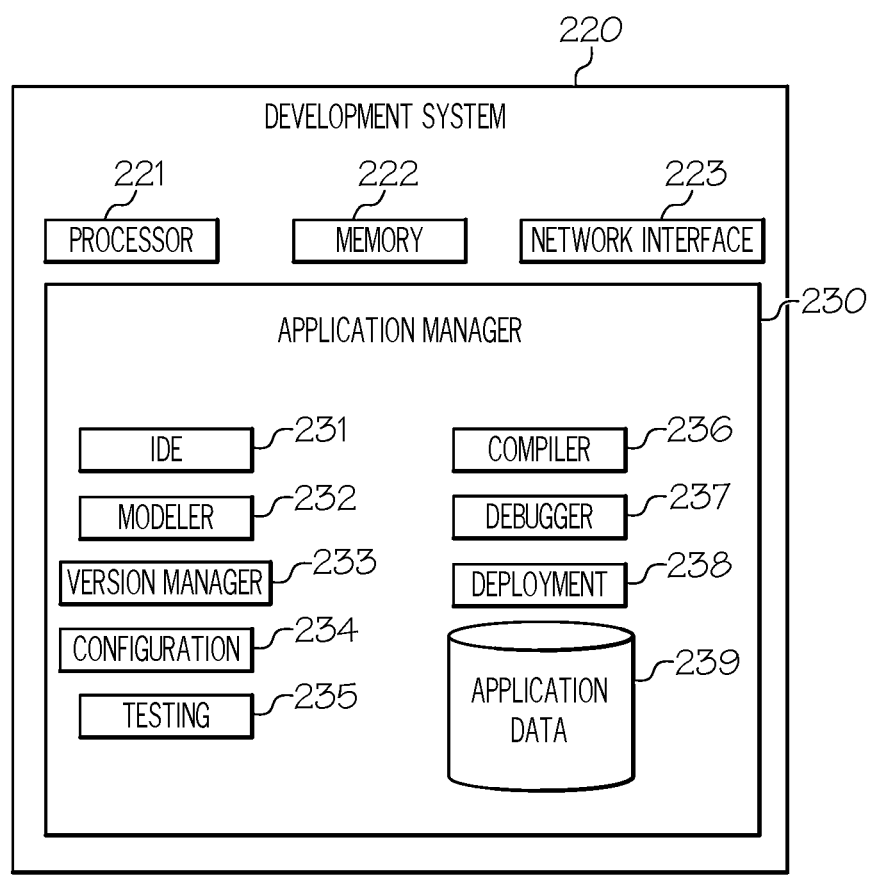
FIG. 2A illustrates a simplified block diagram of an example software development system.

FIG. 2A illustrates a simplified block diagram of an example software development system 220. Software development system 220 may facilitate development, testing, deployment, and/or maintenance of software, such as software applications, programs, libraries, modules, or other software components (e.g., components of larger, multi-tiered software systems). In some embodiments, for example, software development system 220 may be used to implement the functionality of software development system 120 of FIG. 1. In certain embodiments, software development system 220 may include one or more processors 221, memory elements 222, and network interfaces 223, along with application development software, such as application manager 230. In some implementations, the various illustrated components of development system 220, and other associated systems and tools, may be combined, or even further divided and distributed among multiple different systems. For example, in some implementations, development system 220 may be implemented as multiple different systems with varying combinations of the foregoing components (e.g., 221, 222, 223, 230). Components of development system 220 may communicate, interoperate, and otherwise interact with external systems and components (including with each other in distributed embodiments) over one or more networks using network interface 223.

Application manager 230 may include a collection of components, functionality, and/or tools for facilitating development of software applications (e.g., application 110 of FIG. 1). For example, in some embodiments, application manager 230 may include integrated development environment (IDE) 231, application modeler 232, version manager 233, configuration module 234, testing module 235, compiler 236, debugger 237, deployment module 238, and/or application data storage 239, among other potential components, functionality, and tools (along with any combination or further division, distribution, or compartmentalization of the foregoing). In some embodiments, application manager 230, and/or its underlying components, may be implemented using machine executable logic embodied in hardware- and/or software-based components.

In some embodiments, an integrated development environment (IDE) 231 may be included to provide a comprehensive development environment for software developers. IDE 231, for example, may be a software development application with a user interface that integrates access to a collection of software development tools and functionality. For example, IDE 231 may integrate functionality for source code editing, intelligent code completion, application modeling, graphical user interface (GUI) building, version management and control, configuration, compiling, debugging, testing, and/or deployment. The boundary between an integrated development environment (e.g., IDE 231) and other components of the broader software development environment (e.g., software development system 220) may vary or overlap. In some embodiments, for example, IDE 231 may provide an interface that integrates the various components and tools of application manager 230, such as application modeler 232, version manager 233, configuration module 234, testing module 235, compiler 236, debugger 237, and/or deployment module 238.

In some embodiments, an application modeler 232 may be provided to model the architecture of a software application. Software applications may be composed of, include, and/or rely on a variety of underlying software components. For example, applications may be implemented using a variety of software design approaches (e.g., monolithic or microservices architectures), and with a variety of software modules, components, containers, services, microservices (e.g., microservices 115 of FIG. 1), and/or external services (e.g., external services 140 of FIG. 1), among other examples. Microservices applications, for example, may be implemented by packaging a variety of microservices into separate software containers. Application modeler 232 may be used to design, configure, and/or update the architecture of a software application and its underlying components. For example, application modeler 232 may be used to design or configure an application by identifying each underlying component, along with its functionality and responsibilities, configuration, version, and relationship to other components, among other information. This configuration information for the application may be stored by the application modeler 232, for example, using application data storage 239. Application data storage 239 may be local to development system 220 and/or remote from development system 220, such as on a server or end-user device of a software developer. Application modeler 232 may also display a graphical representation of the application's design or architecture. For example, application modeler 232 may display graphical representations of each underlying software component of the application (including, for example, the name, version, and/or configuration of each component), the relationships between the underlying components, and so forth.

In some embodiments, application modeler 232 may also display version state visualizations for the application, for example, as described in connection with version manager 233.

In some embodiments, a compiler 236 may be provided to compile and/or build applications, for example, by compiling the source code of an application developed using development system 220. In some embodiments, a debugger 237 may also be provided to debug applications that are developed using development system 220.

In some embodiments, a configuration module 234 may be provided to configure applications that have been developed, or are being developed, using software development system 220. For example, configuration module 234 may configure underlying software components, microservices, software containers, software images, databases, web servers, external services, network connections, filesystems, and runtime environments of an application, among other examples.

In some embodiments, a testing module 235 may be provided to test software applications that are developed using development system 220. Testing an application may involve numerous complex tests, using many different test cases and use cases, of both the underlying components individually and the application as a whole. Creating the test cases for testing an application may itself be a complex and time-intensive undertaking. In some embodiments, testing module 235 may include model-based testing functionality to facilitate application testing.

In some embodiments, a deployment module 238 may also be provided to deploy applications that are developed using development system 220. For example, once an application has been developed, deployment module 238 may be used to deploy the application for live use by end-users. In some embodiments, for example, deployment module 238 may deploy the application on one or more live production servers, such as application servers 130 of FIG. 1.

In some embodiments, application data storage 239 may be used to store information associated with applications developed using development system 220, such as source code, configurations, version information, application models, and testing models, among other examples.

In some embodiments, a version manager 233 may be provided to facilitate version control and management for software applications. For example, version manager 233 may include a version control system. Version control systems, for example, may be used by software developers to manage changes to software, simultaneously work on different aspects and/or versions of the software, and recover previous versions of the software when needed. For example, version control systems may record the changes to files over time, allowing developers to revert files back to a previous state, revert an entire project back to a previous state, compare changes over time, identify authors and dates for particular files and/or revisions, and so forth.

Version manager 233 may also be used to manage updates to the various packages used by software applications. For example, a software application may rely on a variety of existing software packages or components, including software libraries or environments, application programming interfaces (APIs), other software applications or components (e.g., database servers, web servers), and operating systems, among other examples. During development of a software application, development system 220 may obtain the appropriate software packages for building the application, for example, from a software registry (e.g., software registry 170 of FIG. 1, software registry 270 of FIG. 2B). Throughout the life of the application, new versions of the underlying software packages used by the application may be released (e.g., new versions, releases, updates, patches, bug fixes, or any other revisions). Version manger 233 may facilitate updating the software application, when appropriate, with new versions of its underlying software packages. For example, when a new version of a software package used by the software application is released, version manager 233 may display a visual indication that an update is available for the software package, determine if the new version of the software package is compatible with the application, prompt a developer regarding whether to update the application with the new version of the software package, and/or inform a system operator that the software package is out-of-date. In some embodiments, if an update is appropriate, version manager 233 may also retrieve the new version of the software package and update the software application. For example, in some embodiments, version manager 233 may retrieve a software image or container image corresponding to the new version of the software package, and update the software application to include the new image. In some embodiments, version manager 233 may inform the deployment environment (e.g., an orchestration environment and/or continuous deployment environment) about the outdated components, allowing the deployment environment to perform the appropriate action.

In some embodiments, version manager 233 may include version state visualization functionality to facilitate and/or manage updates to various software packages used by an application. Version state visualization may involve displaying visual indications of the state of each version of the software packages used by an application. For example, version manager 233 may determine whether each software package of the application is updated or outdated, display indications of which software packages are updated or outdated, and/or display indications of the extent that the outdated software packages are out-of-date. Version manager 233 may indicate whether a new version of an outdated software package is a major update (e.g., not backwards compatible), minor update, patch, bug fix, and so forth. Version manager 233 may also indicate any risks associated with updating a software application with a new version of an outdated software package, such as whether the new version of the software package is compatible or incompatible with the software application, or whether it contains a critical security update, among other examples. For example, for a microservices application, version manager 233 may display a graphical representation of each microservice or microservice container of the microservices application, along with indications of which microservice containers are updated, which microservice containers are outdated, and/or the extent that the outdated microservice containers are out-of-date. In this manner, important information regarding updates to containerized environments may be visually conveyed.

In some embodiments, version state information may be derived using semantic versioning and/or checksums. Semantic versioning, for example, is a version numbering scheme that conveys information about the changes introduced by new versions of software packages. For example, each version of a software package that adheres to semantic versioning principles may be designated with a version number in the format MAJOR.MINOR.PATCH. The MAJOR version number of a software package may be incremented when new incompatible functionality is introduced (i.e., functionality that is not backwards compatible); the MINOR version number may be incremented when new backwards-compatible functionality is introduced; and the PATCH version number may be incremented when only (backwards-compatible) bug fixes are introduced. In this manner, when a new version of a software package is released, the semantic version number identifies whether the new version is a MAJOR update, MINOR update, or PATCH update. Version state visualizations may then be used to visualize the information conveyed using semantic versioning, as described further throughout this disclosure.

In addition, version state information may also be derived using checksums. For example, in some cases, each new version of a software package may simply be designated as the "latest" version, without a specific version number. In this manner, it may be difficult to determine whether a software application is using an updated or outdated version of the software package. For example, while a software application may be using a version of the software package designated as "latest," a newer "latest" version of the software package may have been released. Thus, in some embodiments, version manager 233 may use checksums to determine if the application is using the most recent version of a software package. For example, version manager 233 may first retrieve the "latest" version of that software package (e.g., from a software registry), and then compare the checksums of the retrieved "latest" version and the version used by the application. If the checksum of the retrieved "latest" version of the software package is different from the checksum of the version used by the application, then the application may be using an outdated version of the software package. In some embodiments, version manager 233 may use version state visualizations to visually indicate that the application is not using the latest version of a particular software package.

In some embodiments, version manager 233 may visualize the version state information for an application. Version state information may be visualized, for example, by displaying graphical or visual indications of the version state of each software package used by the application, such as, for example, thumbs up and thumbs down symbols, check marks and X marks, emoticons or emojis, colors, icons, and/or any other visual indication of the version state of a software package. Any outdated software packages used by the application may then be updated, if appropriate (e.g., by a software developer and/or by development system 220). In some embodiments, the particular visualizations used by version manager 233 may be configurable, for example, based on the preferences of software developers, the type of application, and/or the development environment. In some embodiments, version state visualization functionality may be implemented by version manager 233, by other components of software development system 220 (e.g., IDE 231, application modeler 232), by the end-user devices of software developers, and/or any combination of the foregoing.

Figure 2B:
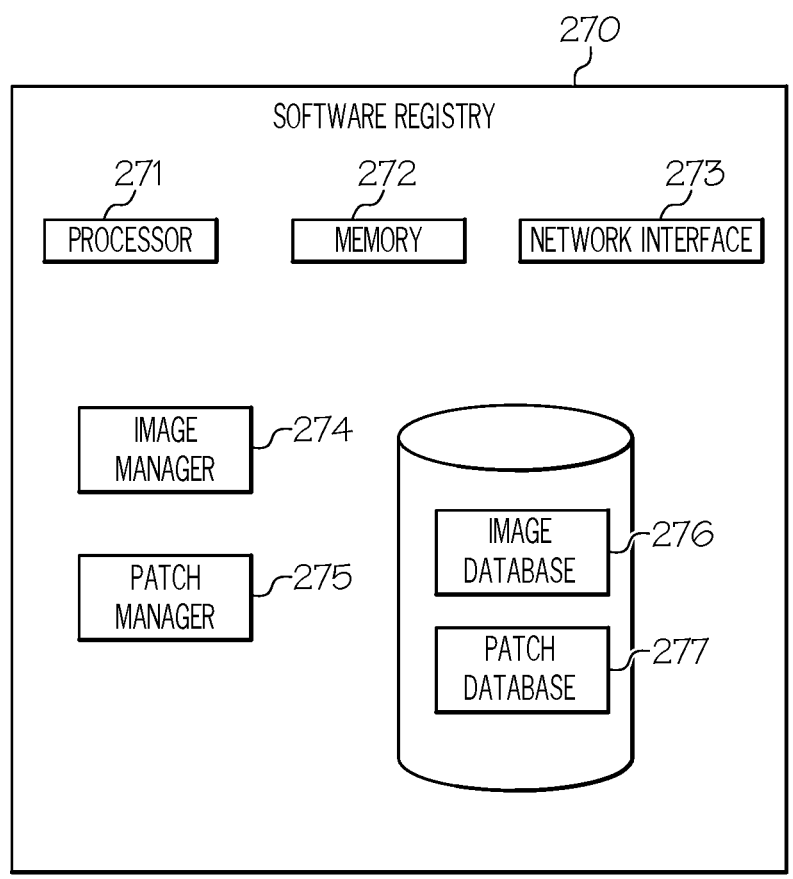
FIG. 2B illustrates a simplified block diagram of an example software registry.

FIG. 2B illustrates a simplified block diagram of an example software registry 270. Software registry 270 may host a repository of software packages that can be used by or used with a particular software application (e.g., application 110 of FIG. 1), including software libraries or environments, application programming interfaces (APIs), other software applications or components (e.g., database servers, web servers), and operating systems, among other examples. In some embodiments, for example, software registry 270 may be used to implement the functionality of software registry 170 of FIG. 1. In certain embodiments, software registry 270 may include one or more processors 271, memory elements 272, and network interfaces 273, along with software registry management software, such as image manager 274 and patch manager 275, and software registry databases, such as image database 276 and patch database 277. In some implementations, the various illustrated components of software registry 270, and other associated systems and tools (e.g., development system 220 of FIG. 2A), may be combined, or even further divided and distributed among multiple different systems. For example, in some implementations, software registry 270 may be implemented as multiple different systems with varying combinations of the foregoing components (e.g., 271, 272, 273, 274, 275, 276, 277). In addition, some or all of the components of software registry 270 may be implemented as part of software development system 220 of FIG. 2A. Components of software registry 270 may communicate, interoperate, and otherwise interact with external systems and components (including with each other in distributed embodiments) over one or more networks using network interface 273.

In some embodiments, an image manager 274 may be used to manage and distribute software images corresponding to various software packages hosted by software registry 270. For example, software applications (e.g., application 110 of FIG. 1) can be developed using a variety of existing software packages, and software registry 270 may host a repository of software packages that can be used by or used with those software applications. Software packages hosted by software registry 270 may be stored, in some embodiments, using software images corresponding to particular software packages. As an example, software packages that are implemented using software containers may be stored in software registry 270 using container images (i.e., images that include all components and dependencies required to run a particular software package in a software container, such as a microservice). In some embodiments, image database 276 may be used to store the software images associated with the software packages hosted by software registry 270. During development of an application, the appropriate software packages for building or updating the application may be retrieved from software registry 270. In addition, throughout the life of the application, any new versions, releases, updates, patches, bug fixes, or other revisions to those associated software packages may also be retrieved from software registry 270. For example, a software development system (e.g., development system 220 of FIG. 2A) may need to retrieve various software packages used by a software application that is under development on the software development system. Accordingly, the software development system may request the appropriate software packages from software registry 270. In some embodiments, image manager 274 may be used to retrieve the appropriate software images from image database 276 and distribute those software images (e.g., over a network) to the requesting software development system.

In some embodiments, a patch manager 275 may be used to manage and distribute software patches associated with software packages hosted by software registry 270. For example, new versions of software packages hosted by software registry 270 may be periodically released. Software registry 270 may be updated to store those new versions and distribute them as needed. In some cases, however, software patches may be utilized for distributing new versions of software packages. For example, patches may be used to generate new versions of software packages by applying the patches to old versions of the software packages. In this manner, if a software developer and/or development system has an older version of a particular software package that needs updating, software registry 270 may distribute a patch that can be used to generate the new version of the software package (e.g., by applying the patch to the old version), rather than re-distributing an entire copy of the new version of the software package. In some embodiments, patch database 277 may be used to store the patches associated with the software packages hosted by software registry 270, and patch manager 275 may be used to manage and distribute those software patches in response to requests received by software registry 270.

Figure 3A:
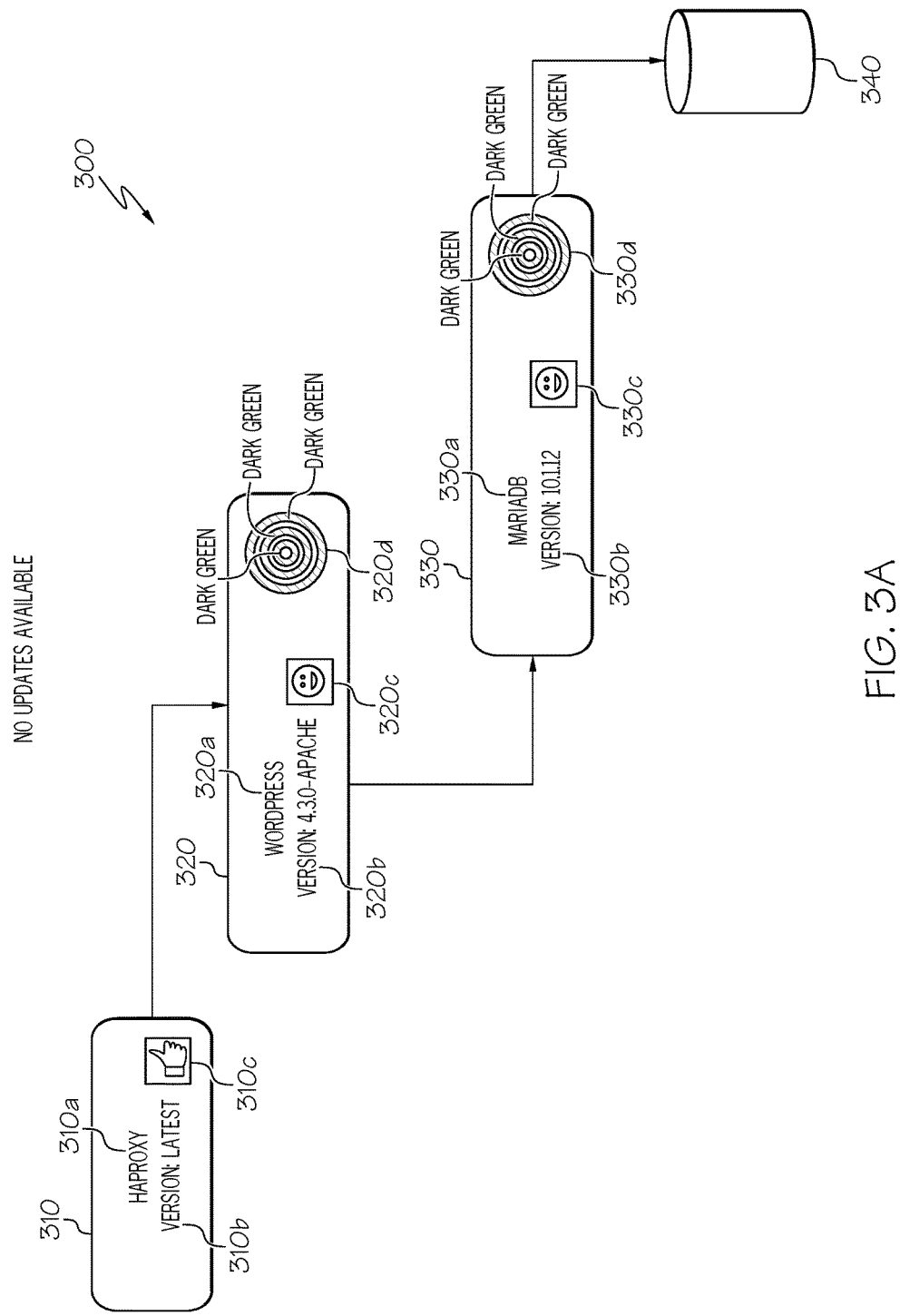
FIGS. 3A, 3B, and 3C illustrate examples of version state visualization for a software application.
Figure 3B:
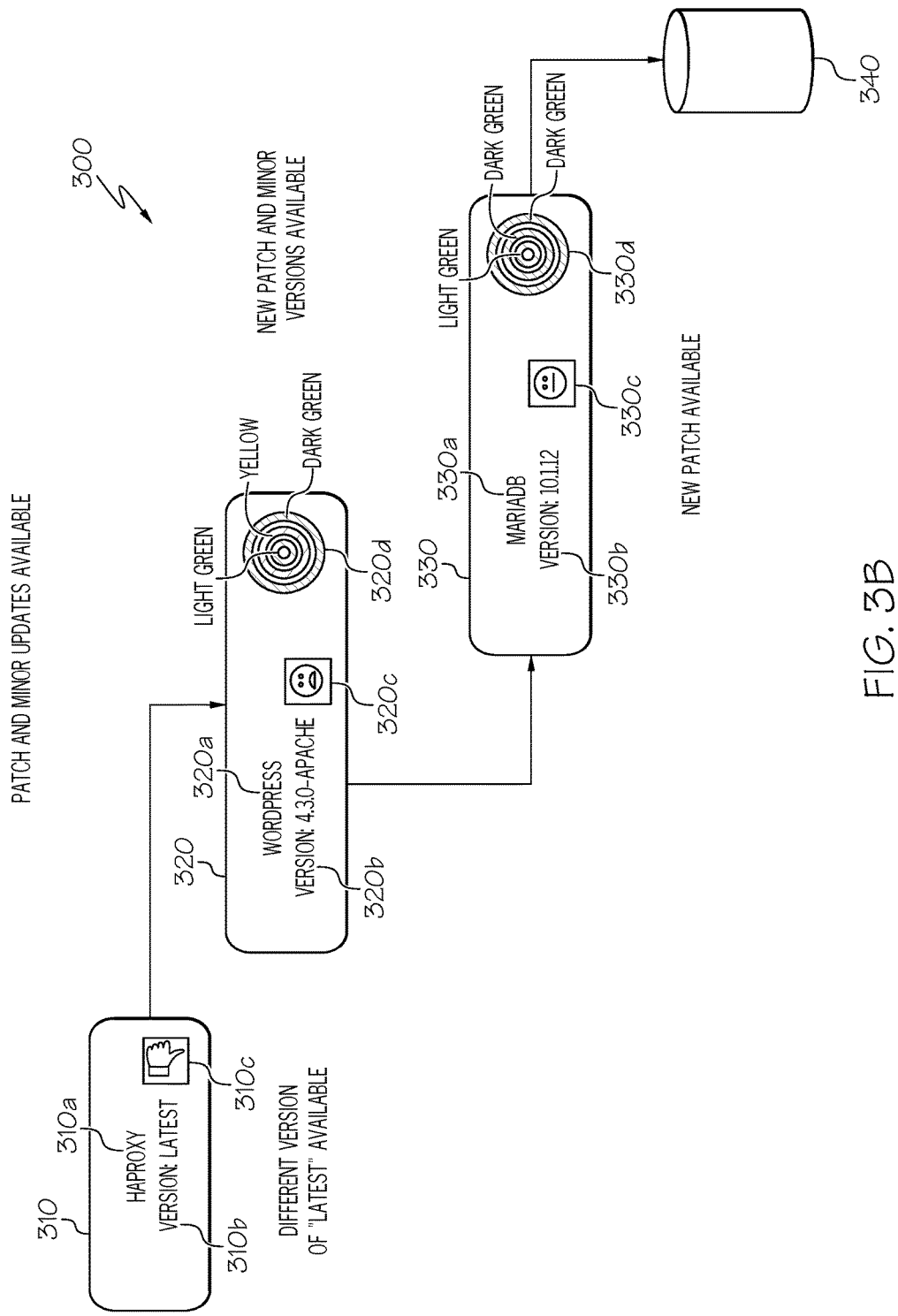
Figure 3C:
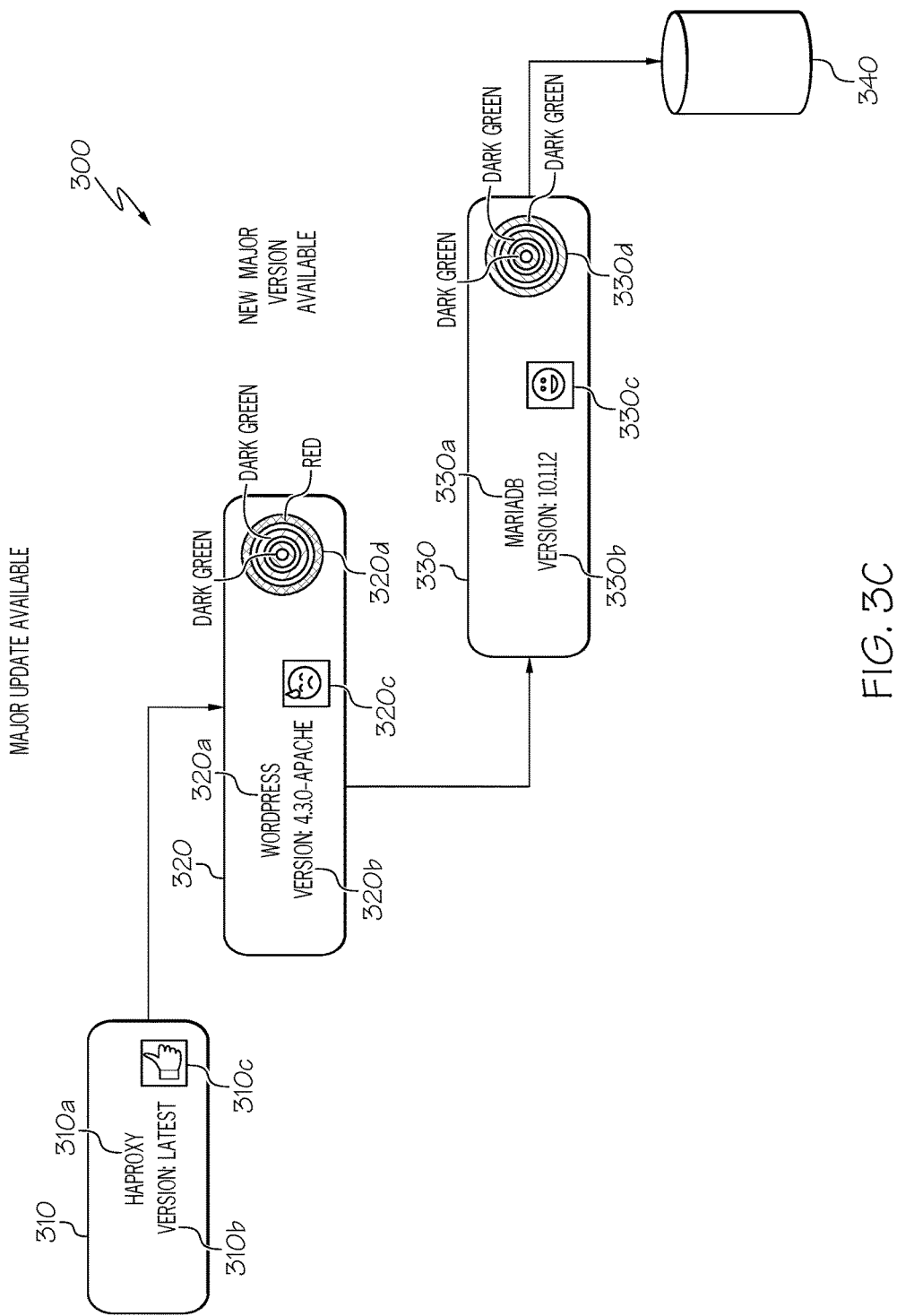

FIGS. 3A, 3B, and 3C illustrate examples of version state visualization for a software application. The illustrated examples provide version state visualizations for a model of a microservices application 300. Each microservice (e.g., 310, 320, 330) of the microservices application 300 is illustrated with its name (e.g., 310a, 320a, 330a), version (e.g., 310b, 320b, 330b), and one or more version state visualizations (e.g., 310c, 320c, 320d, 330c, 330d).

The illustrated microservices application 300 includes three microservices: HAProxy 310, WordPress 320, and MariaDB 330. HAProxy 310 is a load balancer and proxy server that spreads requests for an application across multiple servers. WordPress 320 is a web-based content management system, which may be used, for example, to build websites and/or blogs. MariaDB 330, which is a fork of the mySQL relational database management system, may be used to provide database management services. In the illustrated microservices application 300, HAProxy 310 is connected to WordPress 320, which indicates that HAProxy 310 is used to provide load balancing for WordPress 320. In addition, WordPress 320 is connected to MariaDB 330, which indicates that WordPress 320 uses database management services provided by MariaDB 330. Finally, MariaDB 330 is connected to database 340, which indicates that database 340 is used by MariaDB to provide its database management services. In some embodiments, microservices application 300 may be implemented using software containers, for example, by packaging the microservices (e.g., 310, 320, and 330) into separate container images that each runs in its own software container.

In the illustrated examples, version state visualizations are used to indicate version state information for each component (e.g., microservice container/container image) of the microservices application 300. The version state visualizations in the illustrated examples include icons, emojis, and colors. For example, the illustrated examples use thumbs up and thumbs down symbols (e.g., 310c of FIGS. 3A and 3B) to indicate whether components designated as the "latest" version are up-to-date or out-of-date. The illustrated examples also use four different emoji icons to indicate the extent to which a particular component is out-of-date: happy emojis (e.g., 320c of FIG. 3A), sad emojis (e.g., 320c of FIG. 3C), upset emojis (e.g., 320c of FIG. 3B), and concerned emojis (e.g., 330c of FIG. 3B).

The illustrated examples also use colored target icons to indicate the extent to which a particular component is out-of-date (e.g., 320d of FIG. 3A). In the illustrated examples, the target icons include three colored rings. The rings of a target icon represent different levels of the extent that a component could be outdated, and the color of an individual ring indicates whether the component is outdated to the level or extent represented by that ring. For example, in embodiments that use semantic versioning, the rings of a target icon could correspond to the availability of MAJOR updates (outer ring), MINOR updates (middle ring), and PATCH updates (inner ring). A first color (e.g., dark green) could be used to indicate that there are no updates to the component for the particular level or extent represented by a given ring of the target. For example, if all three rings of the target are the first color (e.g., dark green), then the component may be completely up-to-date (i.e., there are no MAJOR, MINOR, or PATCH updates). A second color (e.g., light green) could be used to indicate that a new PATCH is available for a particular component. For example, a new PATCH may be available when the inner ring of the target (which corresponds to PATCH updates) is the second color (e.g., light green) instead of the first color (e.g., dark green). A third color (e.g., yellow) could be used to indicate that a new MINOR version is available for a particular component. For example, a new MINOR version may be available when the middle ring of the target (which corresponds to MINOR updates) is the third color (e.g., yellow) instead of the first color (e.g., dark green). A fourth color (e.g., red) could be used to indicate that a new MAJOR version is available for a particular component. For example, a new MAJOR version may be available when the outer ring of the target (which corresponds to MAJOR updates) is the fourth color (e.g., red) instead of the first color (e.g., dark green).

Colors may also be used to indicate risks associated with a given update. For example, in some embodiments, a particular color (e.g., the light green color used for PATCH updates) may be used to indicate that the update is low risk and should be compatible. Similarly, another color (e.g., the yellow color used for MINOR updates) may be used to indicate that the update is medium risk and some caution should be exercised when updating. Similarly, another color (e.g., the red color used for MAJOR updates) may be used to indicate that the update is high risk, not backwards-compatible, and/or may break the application. Any other colors and/or combinations of colors may also be used to represent risks associated with updating or failing to update. For example, in some embodiments, colors may be used to represent the severity of a security update.

While the examples illustrated in FIGS. 3A, 3B, and 3C use the visualizations described above, other embodiments may use any type of visualization to convey version state information (e.g., different icons, graphics, symbols, shapes, emojis, emoticons, colors, and so forth).

Turning to FIG. 3A, this figure illustrates an example where no updates are available for the components of the microservices application 300. In the illustrated example, the HAProxy component 310 is using version "latest" (310b), and its version state visualizations include a thumbs up icon (310c). As explained throughout this disclosure, a software component designated as version "latest" may not necessarily be up-to-date, as a newer "latest" version of the software component may have been released. Thus, in some embodiments, checksums may be used to determine if an application is in fact using the most recent version of the software component (e.g., by comparing the checksum of the version used by the application with the checksum of the "latest" version from the developer or vendor). In the illustrated example, the thumbs up icon (310c) indicates that the most recent version of the HAProxy component 310 is in fact being used (e.g., based on the checksums, the version used by the microservices application 300 is the same as the "latest" version available from the developer, vendor, or a software registry).

The WordPress component 320 is using version 4.3.0-apache (320b), and its version state visualizations include a happy emoji (320c) and target icon (320d). The happy emoji (320c) indicates that the WordPress component 320 is completely up-to-date. This is also confirmed by the target icon (320d), whose rings are all dark green and thus indicate that no MAJOR, MINOR, or PATCH updates are available.

The MariaDB component 330 is using version 10.1.12 (330b), and its version state visualizations include a happy emoji (330c) and target icon (330d). The happy emoji (330c) indicates that the MariaDB component 330 is completely up-to-date. This is also confirmed by the target icon (330d), whose rings are all dark green and thus indicate that no MAJOR, MINOR, or PATCH updates are available.

Turning to FIG. 3B, this figure illustrates an example where PATCH and MINOR updates are available for components of the microservices application 300. In the illustrated example, the HAProxy component 310 is using version "latest" (310b), and its version state visualizations include a thumbs down icon (310c). As explained throughout this disclosure, a software component designated as version "latest" may not necessarily be up-to-date, as a newer "latest" version of the software component may have been released. Thus, in some embodiments, checksums may be used to determine if an application is in fact using the most recent version of the software component (e.g., by comparing the checksum of the version used by the application with the checksum of the "latest" version from the developer or vendor). In the illustrated example, the thumbs down icon (310c) indicates that an outdated version of the HAProxy component 310 is being used (e.g., based on the checksums, a newer or different "latest" version is available from the developer/vendor).

The WordPress component 320 is using version 4.3.0-apache (320b), and its version state visualizations include an upset emoji (320c) and a target icon (320d). The upset emoji (320c) indicates that the WordPress component 320 is out-of-date, and that new PATCH and MINOR updates are available. This is also confirmed by the target icon (320d), which has an outer ring that is dark green (indicating that no MAJOR update is available), a middle ring that is yellow (indicating that a MINOR update is available), and an inner ring that is light green (indicating that a PATCH update is available).

The MariaDB component 330 is using version 10.1.12 (330b), and its version state visualizations include a concerned emoji (330c) and target icon (330d). The concerned emoji (330c) indicates that the MariaDB component 330 is out-of-date, and that a new PATCH update is available. This is also confirmed by the target icon (330d), which has an outer ring that is dark green (indicating that no MAJOR update is available), a middle ring that is dark green (indicating that no MINOR update is available), and an inner ring that is light green (indicating that a PATCH update is available).

Turning to FIG. 3C, this figure illustrates an example where a MAJOR update is available for a component of the microservices application 300. In the illustrated example, the HAProxy component 310 is using version "latest" (310b), and its version state visualizations include a thumbs up icon (310c). As explained in connection with the examples above, the thumbs up icon (310c) indicates that the most recent version of the HAProxy component 310 is being used (e.g., based on the checksums, the version used by the microservices application 300 is the same as the "latest" version available from the developer, vendor, and/or a software registry).

The WordPress component 320 is using version 4.3.0-apache (320b), and its version state visualizations include a sad emoji (320c) and a target icon (320d). The sad emoji (320c) indicates that the WordPress component 320 is out-of-date, and that a new MAJOR update is available. This is also confirmed by the target icon (320d), which has an outer ring that is red (indicating that a MAJOR update is available), a middle ring that is dark green (indicating that no MINOR update is available), and an inner ring that is dark green (indicating that no PATCH update is available).

The MariaDB component 330 is using version 10.1.12 (330b), and its version state visualizations include a happy emoji (330c) and target icon (330d). The happy emoji (330c) indicates that the MariaDB component 330 is completely up-to-date. This is also confirmed by the target icon (330d), whose rings are all dark green and thus indicate that no MAJOR, MINOR, or PATCH updates are available.

Figure 4B:
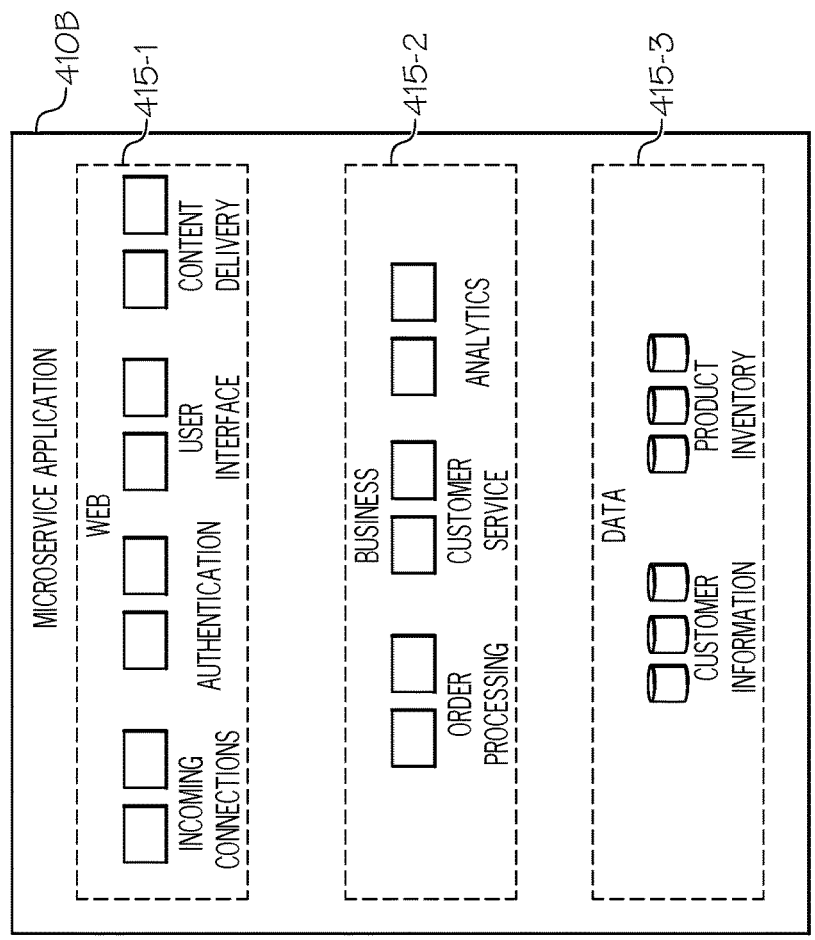
FIG. 4B illustrates an example microservices architecture for a software application.
Figure 4A:
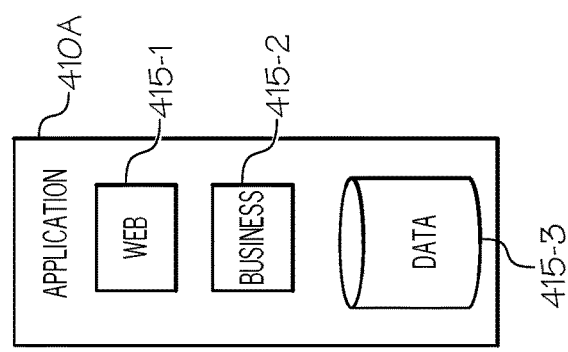
FIG. 4A illustrates an example monolithic architecture for a software application.

FIGS. 4A and 4B illustrate example monolithic and microservices architectures for a software application. Software applications can be implemented using many different software design approaches, including monolithic-based architectures and microservice-based architectures. FIG. 4A illustrates an example monolithic architecture for a software application, and FIG. 4B illustrates an example microservices architecture for the same software application.

A monolithic application, for example, may be implemented as a single application that integrates all associated components and functionality. While a monolithic application may have a logically modular architecture, it is packaged and deployed as one large application. For example, in FIG. 4A, monolithic application 410A is a single application with multiple logical components 415, including web logic 415-1, business logic 415-2, and data storage logic 415-3. Monolithic applications are very common, as they are straightforward to develop since many development tools (e.g., IDEs) focus on building single applications. Monolithic applications can also be simpler to test. End-to-end testing can be performed by simply launching the application and testing the user interface (e.g., using testing software). Monolithic applications are also simple to deploy—the complete application package can simply be copied to an application server and launched.

Monolithic approaches may work well in the early stages of an application and for smaller applications. Many applications, however, grow over time and eventually become highly complex. Accordingly, monolithic applications may be inefficient to develop and maintain, as they are often too complex for any single developer to fully understand, making simple tasks such as bug fixes and feature updates very difficult. In addition, any updates to the application, even if minor, often require the entire application to be tested and redeployed. Monolithic applications also make it difficult to adopt new programming languages, frameworks, or other new software technologies. Rewriting a large, complex application (e.g., with millions of lines of code) using a new technology is often impractical, leaving developers stuck with the original technologies that were chosen at the outset. Monolithic applications can also be unreliable. Because all functionality is running within the same process, any minor bug (e.g., memory leak) or hardware failure can be fatal to the entire application. Continuous deployment may also be challenging for monolithic applications. Continuous deployment is a software development trend to continuously push new changes into production rather than sporadically release new functionality, which can be very difficult for monolithic applications since the entire application must be redeployed when any aspect is updated. Scaling monolithic applications efficiently may also be challenging, as it requires instances of the entire application to be deployed, even if only one aspect of the application needs to be scaled. In addition, monolithic applications are often deployed on hardware that is pre-scaled for peak loads. When a monolithic application outgrows its hardware, the hardware may have to be "scaled up" or upgraded rather than reconfiguring the datacenter and/or updating the software architecture of the application.

Even if the web, business, and data logic of a monolithic application is decomposed into separate applications to provide some level of developer agility and independent scaling, each logical tier often becomes its own separate monolithic application that integrates diverse functionality into a single software package, and thus may still suffer from challenges faced by monolithic applications.

While monolithic architectures may be suitable for certain types of applications, microservice-based architectures may be preferable for large, complex applications that require flexible development, deployment, and scaling (e.g., cloud-based applications). A microservices application, for example, may be implemented using multiple separate and self-contained applications, or microservices, that each provide a particular service and collectively form a fully functional application. A microservices architecture may allow each underlying microservice of an application to be independently developed, deployed, updated, and scaled, resulting in numerous efficiencies in the software development process.

For example, in FIG. 4B, microservices application 410B includes a variety of microservices 415 to implement the web logic, business logic, and data storage logic. For example, the web logic is implemented using various microservices 415-1 responsible for incoming connections, authentication, the user interface, and web content delivery. The business logic is implemented using various microservices 415-2 responsible for order processing, customer service, and analytics. The data storage logic is implemented using various microservices 415-3 responsible for managing storage of customer information and product inventory. In microservice-based architectures, each discrete function or service of an application is implemented by its own microservice, and each microservice is itself an independent application. Microservices are often designed to communicate using simple and well-known communication methods and protocols, such as lightweight RESTful APIs (i.e., application programming interfaces (API) implemented using representational state transfer (REST) architectures).

Microservices applications can be developed and maintained more efficiently, as complex applications are broken up into multiple smaller and more manageable applications, or microservices. The functionality of each microservice often is so focused that a particular microservice can be used for multiple different applications. Microservice-based architectures also enable the underlying microservices to be developed independently by different software development teams. Microservices can be developed using the most appropriate programming language and/or technology for each microservice, rather than being stuck with obsolete technologies or technologies that may only be suitable for certain types of microservices. The independent, distributed nature of microservice-based applications also enables them to be independently deployed and independently updated. In addition, microservice-based architectures facilitate rolling updates, where only some instances of a particular microservice are updated at any given time, allowing buggy updates to be "rolled back" or undone before all instances of the microservice are updated.

Microservice-based architectures also enable each microservice to be scaled independently, resulting in more efficient load balancing. Microservices can be scaled by deploying any number of instances of a particular microservice needed to satisfy the capacity and availability constraints of that microservice. For example, if there is a spike in incoming traffic to an application, the microservice responsible for handling incoming connections could be scaled without scaling other microservices of the application. A microservice can also be deployed on the hardware that is best-suited for its respective requirements and functionality.

Microservices applications can be implemented using virtual machines or software containers. Software containers can be an effective complement to a microservices application, as they can be used to ensure that each microservice runs the same in any environment or infrastructure, out-of-the-box. A microservices application, for example, could be implemented using the software container environment described in connection with FIG. 5.

Microservice-based architectures are integral to various software technology advancements, including cloud-based applications and services, continuous integration and continuous deployment (CI/CD), and software container technology, among other examples.

Version state visualization functionality, as described throughout this disclosure, can be implemented for both microservices and monolithic architectures. For example, for microservices architectures, version state visualizations can be provided for each microservice used by a microservices application. Similarly, for monolithic architectures, version state visualizations can be provided for the different software components or packages of the monolithic application.

Figure 5:
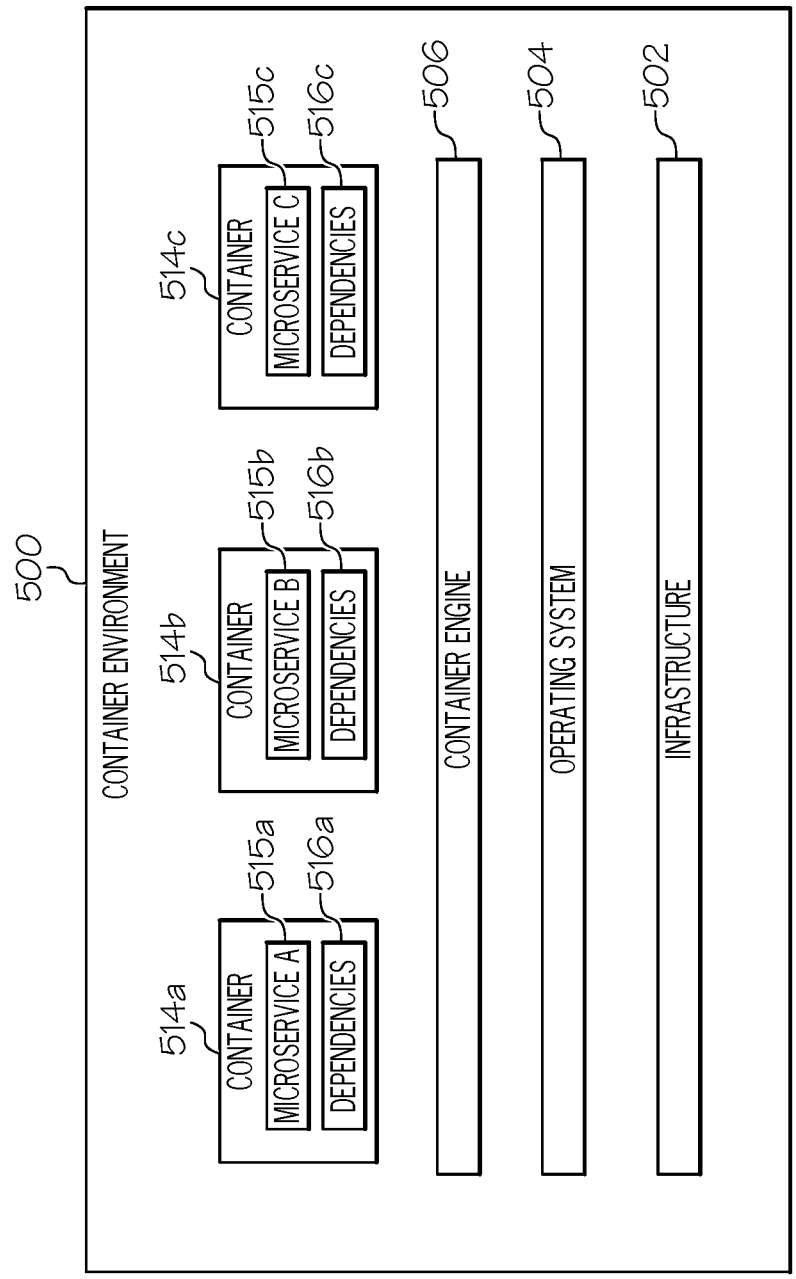
FIG. 5 illustrates an example software container environment.

FIG. 5 illustrates an example software container environment 500. In some cases, software applications may be implemented using software containers, such as Docker containers, containers based on the Open Container Initiative (OCI), and/or any other software container implementation. Analogous to shipping containers, software containers may package a particular software component with all of its dependencies to ensure that it runs the same in any environment or infrastructure, out-of-the-box. For example, a software container may package everything required to run a particular software component, such as the code, software libraries, configuration, files, runtime environment, and any other associated tools or applications.

Software containers enable applications to be migrated across various infrastructures and environments without any modifications or environment-specific configurations. For example, applications can be migrated to or from local workstations, development servers, test environments, and/or production environments. Software containers also enable applications to be developed using the best programming languages and tools for each application, without any internal conflicts from the requirements of different applications. Many inefficiencies of software development and deployment are eliminated with software containers, such as time spent configuring development and production environments, concerns about inconsistencies between development and production environments, and so forth. Software containers also avoid locking developers into any particular platform, software technology, and/or vendor.

Software containers running on the same machine may also share a host operating system, thus avoiding the inefficiencies of virtual machines, which each require their own guest operating system on top of the host operating system. Accordingly, in comparison to virtual machines, software containers may launch faster and use less memory.

Software components implemented using software containers may be stored as container images, which may include all components and dependencies required to run a particular software component in a software container. A container image, for example, may be a file format used to package the components and dependencies of a containerized software component. Container images may be constructed using layered filesystems that share common files, resulting in less disk storage and faster image downloads. In some cases, container images may be hosted by a software registry (e.g., software registries 170 of FIG. 1 or 270 of FIG. 2B) to provide a central repository for distributing container images to software developers. Examples of container images include Docker container images, container images based on the Open Container Initiative (OCI), and/or any other container image format. The Open Container Initiative (OCI), for example, is a collaborative effort by the software industry to develop an open, vendor-neutral, and portable implementation of software containers, to ensure that compliant software containers are portable across all major operating systems and platforms that are also compliant. The OCI implementation is based on the implementation of Docker containers.

Software container environment 500 illustrates an example of a containerized implementation for a microservices application. While microservice-based architectures have many benefits, managing the microservices of an application can become challenging as the application grows and the number of microservices increases. For example, each microservice may have unique build and configuration requirements, including its own software dependencies, which may require each microservice to be custom built and/or configured, additional software to be installed, and so forth. Accordingly, software containers can be an effective complement to a microservices application, as they can be used to ensure that each microservice runs the same in any environment or infrastructure, out-of-the-box. Software containers can be used to implement microservices applications, for example, by packaging each microservice of an application into a separate software container.

In the illustrated example, container environment 500 includes infrastructure 502, operating system 504, container engine 506, and software containers 514. Infrastructure 502 includes the underlying hardware and/or software infrastructure used to provide the containerized environment, such as an application server (e.g., application server 130 of FIG. 1). Operating system 504 is operating system software executing on infrastructure 502, which can be any operating system adapted to provide a containerized environment, such as Linux, other UNIX variants, Microsoft Windows, Windows Server, Mac OS, Apple iOS, and/or Google Android, among others. Container engine 506 includes software responsible for providing and managing the containerized environment 500, such as a Docker container engine, an OCI-based container engine, and/or any other type of software container engine. Software containers 514 are containers that execute distinct software components in their own respective environments. In the illustrated example, containers 514 each include a microservice 515 and its associated dependencies 516. For example, container 514a includes microservice A (515a) and its dependencies (516a), container 514b includes microservice B (515b) and its dependencies (516b), and container 514c includes microservice C (515c) and its dependencies (516c). These microservices 515 may collectively form a microservices application that is executing on infrastructure 502 in a containerized environment 500.

Version state visualization functionality, as described throughout this disclosure, may be used with applications that are implemented using software containers. For example, applications implemented using software containers may include many different container images (e.g., a container image for each microservice of a containerized microservices application). New versions of the underlying microservices and associated container images may be released independently, as they may be developed by different development teams and/or entities. Thus, the timing and frequency of new versions may vary for each microservice and/or container image used by the application. In addition, new versions of the underlying microservices may or may not be compatible with the application, depending on the extent of the changes. Accordingly, version state visualizations may be used, as described throughout this disclosure, to ensure that the microservices (and associated container images) of a containerized microservices application are updated with the latest compatible versions. For example, for a containerized microservices application, an application modeler may display a graphical representation of each microservice (and/or its associated container image) of the microservices application, along with indications of which microservice containers are updated, which microservice containers are outdated, and/or the extent that the outdated microservice containers are out-of-date. As another example, version state visualizations may be used to visualize version information for the layers of a container and/or container image (e.g., for a containerized monolithic application that is implemented on top of other software packages).

Figure 6:
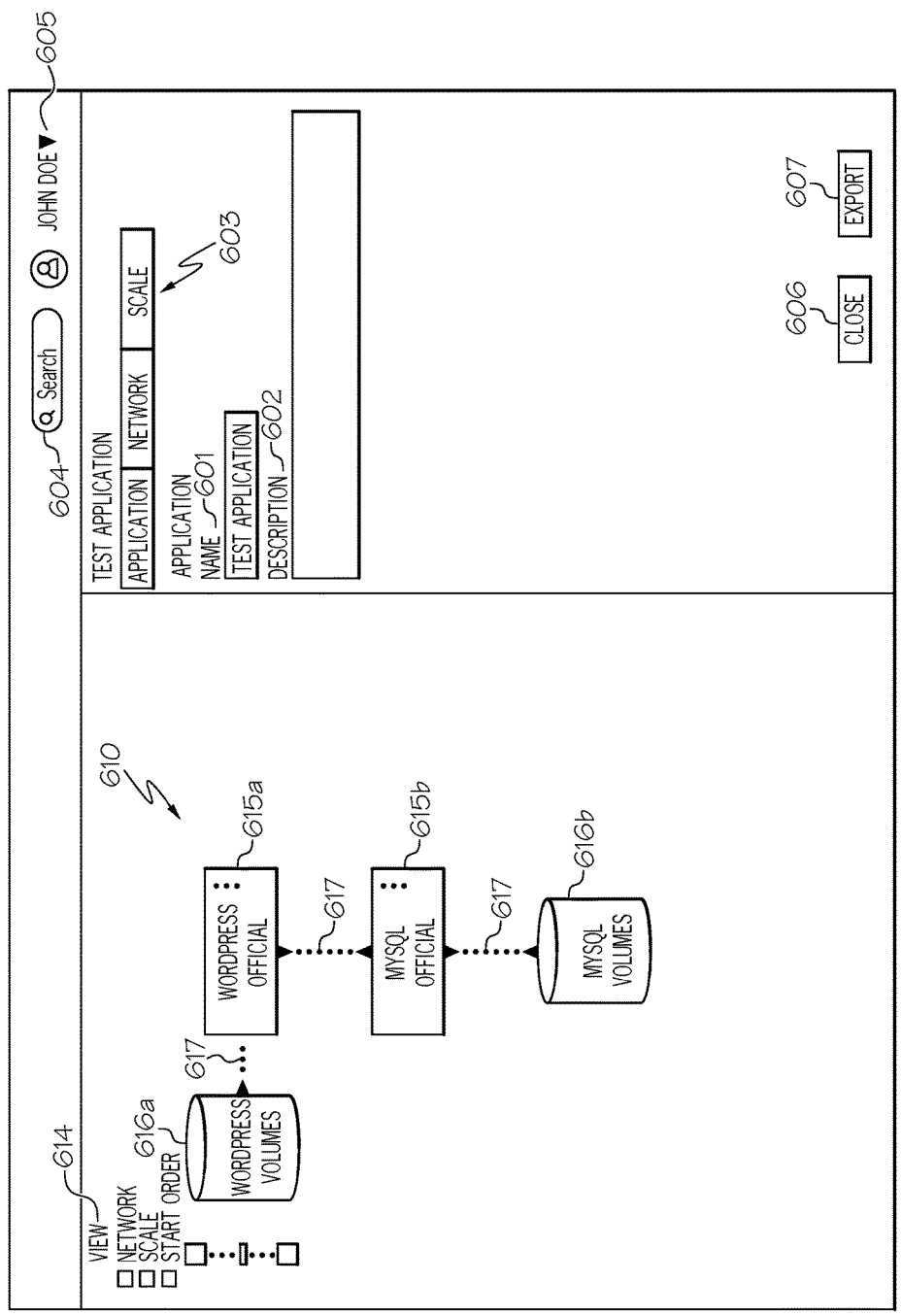
FIG. 6 illustrates an example application modeling and development tool.

FIG. 6 illustrates an example application modeling and development tool 600. Modeling and development tool 600 may be used, for example, to provide application modeling functionality and/or other application development functionality. For example, modeling and development tool 600 may be used to model the architecture of a software application, and/or to facilitate configuration, maintenance, and/or deployment of an application. In some embodiments, for example, modeling tool 600 may be used to provide the functionality of application modeler 232 of FIG. 2A, and/or the functionality of other components of development system 220 of FIG. 2A.

Modeling tool 600 may be used to design, configure, and/or update the architecture of a software application and its underlying components. Software applications may be composed of, include, and/or rely on a variety of underlying software components. For example, applications may be implemented using a variety of software design approaches (e.g., monolithic or microservices architectures), and with a variety of software modules, components, containers, services, microservices, and/or external services, among other examples. Modeling tool 600 may be used to design or configure an application, for example, by identifying each underlying component, along with its functionality and responsibilities, configuration, version, and/or relationship to other components, among other information. This configuration information for the application may be created, obtained, stored, and/or displayed using modeling tool 600. Modeling tool 600 may display the application's design or architecture, for example, by displaying graphical representations of each underlying software component of the application (including, for example, the name, version, and/or configuration of each component), the relationships between the underlying components, and so forth.

In some embodiments, modeling tool 600 may be a tool used for modeling and/or developing microservices applications, such as the Yipee.io tool or other microservices development tool. Microservices applications, for example, may be implemented by packaging a variety of microservices into separate software containers. In the illustrated embodiment, modeling tool 600 is used to model the architecture of a microservices application 610 and its associated microservices 615. For example, modeling tool 600 displays representations of each component of application 610, including microservices 615 and storage volumes 616, and also identifies the relationships 617 among those components. Modeling tool 600 also provides various viewing options 614 for application 610, including network, scale, and start order views. Modeling tool 600 also displays modifiable configuration fields for application 610, including the name 601 and description 602 of the application, among others. In the illustrated embodiment, the configurable fields and parameters are broken up into categories 603 (i.e., the application, network, and scale categories 603). Modeling tool 600 also provides search functionality 604 (e.g., to find components that are outdated or otherwise no longer the "latest" version), identifies the current user or developer 605, and includes buttons for closing 606 and/or exporting 607 the configuration of an application 610.

In some embodiments, modeling and development tool 600 may also provide other microservices development functionality, including configuration, maintenance, and/or deployment of microservices applications. For example, modeling and development tool 600 may be used to configure the orchestration environment for a microservices application, such as an orchestration environment provided by Kubernetes, Docker Swarm, and/or Apache Mesos, among other orchestration tools. Orchestration tools, for example, may be used to facilitate and/or automate deployment, scaling, and/or operation of containerized applications.

In some embodiments, modeling tool 600 may also provide the version state visualization functionality described throughout this disclosure, such as the version state visualization functionality described in connection with version manager 233 of FIG. 2A and/or the examples of FIGS. 3A, 3B, and 3C. For example, modeling tool 600 may determine whether each software component of an application is updated or outdated, display indications of the components that are updated or outdated, and/or display indications of the extent that the outdated components are out-of-date. For example, for a microservices application, modeling tool 600 may display a graphical representation of each microservice or microservice container of the microservices application, along with indications of which microservice containers are updated, which microservice containers are outdated, and/or the extent that the outdated microservice containers are out-of-date. In the illustrated embodiment, for example, version state visualizations could be displayed for each microservice 615, similar to the version state visualizations displayed in the examples of FIGS. 3A, 3B, and 3C. In some embodiments, modeling tool 600 may inform the deployment environment (e.g., an orchestration environment and/or continuous deployment environment) about the outdated components, allowing the deployment environment to perform the appropriate action.

Figure 7:
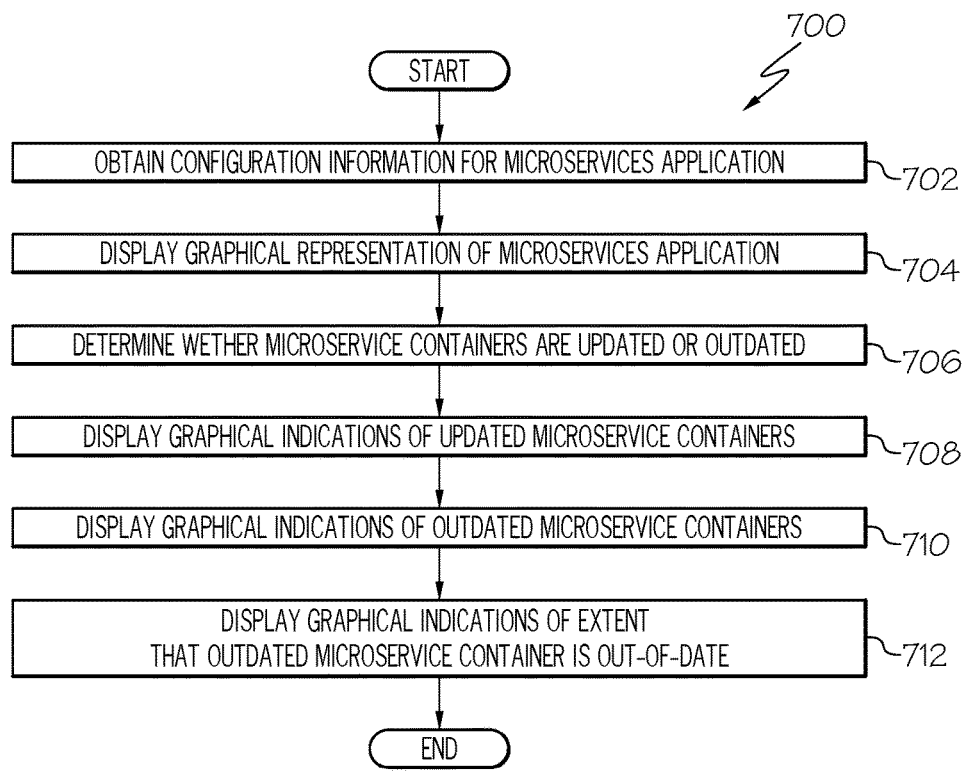
FIG. 7 illustrates a flowchart for an example embodiment of version state visualization for software applications.

FIG. 7 illustrates a flowchart 700 for an example embodiment of version state visualization for software applications. Flowchart 700 may be implemented, in some embodiments, by the components described throughout this disclosure (e.g., development system 120 of FIG. 1 and/or development system 220 of FIG. 2A).

The flowchart may begin at block 702 by obtaining configuration information for a microservices application. The configuration information, for example, may identify each underlying microservice of the microservices application, along with its functionality and responsibilities, configuration parameters, version, and relationship to other microservices or components, among other information. In some embodiments, the configuration information may be created and/or stored using an application modeler.

The flowchart may then proceed to block 704 to display a graphical representation of the microservices application. For example, in some embodiments, the graphical representation of the microservices application may include graphical representations of each underlying microservice container (including, for example, the name, version, and/or configuration of each microservice container), the relationships between the microservice containers, and so forth.

The flowchart may then proceed to block 706 to determine whether the microservice containers of the microservices application are updated or outdated. For example, in some embodiments, outdated microservice containers may be identified based on the version numbers of the microservice containers (e.g., by determining whether the version number of each microservice container differs from the most recent version number for that container). In addition, in some embodiments, outdated microservice containers may be identified using checksums, for example, by determining if the checksum of a microservice container differs from the checksum of the latest version of that container from the developer or vendor.

The flowchart may then proceed to block 708 to display graphical indications of the microservice containers that are updated. The flowchart may then proceed to block 710 to display graphical indications of the microservice containers that are outdated. The flowchart may then proceed to block 712 to display a graphical indication of the extent to which an outdated microservice container is out-of-date. In some embodiments, for example, the extent to which an outdated microservice container is out-of-date may indicate whether an update for the outdated microservice container is a MAJOR version update, MINOR version update, PATCH update, or bug fix, whether the update is backwards compatible, and/or whether there are any risks associated with the update. In some embodiments, semantic versioning may be used to determine whether the update is a MAJOR update, MINOR update, or PATCH update. The graphical indications displayed in blocks 708, 710, and 712 may include, for example, thumbs up and thumbs down symbols, check marks and X marks, emojis, emoticons, colors, and/or any other icons, graphics, symbols, shapes, or visual indications of the version state of the microservice containers.

At this point, the flowchart may be complete. In some embodiments, however, the flowchart may restart and/or certain blocks may be repeated. For example, in some embodiments, the flowchart may restart at block 702, or the flowchart may repeat blocks 706-712 in order to display any changes to the version state of the microservice containers.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as suited to the particular use contemplated.

The invention claimed is:

1. A method comprising:
identifying a current implementation of a microservices application, wherein the microservices application comprises a plurality of microservice containers, and wherein each microservice container comprises an environment for executing a particular microservice on one or more processors;
determining version state information for the microservices application, wherein the version state information comprises an indication of:
one or more up-to-date microservice containers from the plurality of microservice containers;
one or more out-of-date microservice containers from the plurality of microservice containers; and
an extent to which the one or more out-of-date microservice containers are outdated;
displaying a graphical representation of the microservices application, wherein the graphical representation of the microservices application comprises:
a graphical representation of the plurality of microservice containers; and
a plurality of version state visualizations, wherein the plurality of version state visualizations comprises a plurality of graphical indications of: the one or more up-to-date microservice containers; the one or more out-of-date microservice containers; and the extent to which the one or more out-of-date microservice containers are outdated;
prompting a user regarding whether to update the one or more out-of-date microservice containers; and
updating the one or more out-of-date microservice containers based on prompting the user.

2. The method of claim 1, wherein determining the version state information for the microservices application further comprises:
  determining that an update is available for a particular out-of-date microservice container of the one or more out-of-date microservice containers; and
  determining a backwards compatibility of the update for the particular out-of-date microservice container; and
  wherein the plurality of version state visualizations further comprises a graphical indication of the backwards compatibility of the update for the particular out-of-date microservice container.

3. The method of claim 1, wherein determining the version state information for the microservices application further comprises determining that a bug fix update is available for a particular out-of-date microservice container of the one or more out-of-date microservice containers; and
  wherein the plurality of version state visualizations further comprises a graphical indication that the bug fix update is available for the particular out-of-date microservice container.

4. The method of claim 1:
  wherein determining the version state information for the microservices application further comprises determining a risk associated with updating a particular out-of-date microservice container of the one or more out-of-date microservice containers; and
  wherein the plurality of version state visualizations further comprises a graphical indication of the risk associated with updating the particular out-of-date microservice container.

5. The method of claim 1, wherein determining the version state information for the microservices application further comprises:
  identifying a current version number for a particular out-of-date microservice container of the one or more out-of-date microservice containers, wherein the particular out-of-date microservice container is used in the current implementation of the microservices application;
  identifying an updated version number for an update to the particular out-of-date microservice container; and
  determining, based on the current version number and the updated version number, whether the update to the particular out-of-date microservice container comprises a major update, a minor update, or a patch update; and
  wherein the plurality of version state visualizations further comprises a graphical indication of whether the update to the particular out-of-date microservice container comprises the major update, the minor update, or the patch update.

6. The method of claim 1, wherein the plurality of version state visualizations further comprises a plurality of colors indicating the extent to which the one or more out-of-date microservice containers are outdated.

7. The method of claim 6, wherein the plurality of colors comprises a first color to indicate that a major update is available, a second color to indicate that a minor update is available, and a third color to indicate that a patch is available.

8. The method of claim 1, wherein determining the version state information for the microservices application further comprises:
  identifying a first version of a particular microservice container of the plurality of microservice containers, wherein the first version of the particular microservice container is used in the current implementation of the microservices application;
  identifying a second version of the particular microservice container, wherein the second version of the particular microservice container comprises a latest release of the particular microservice container;
  determining whether the first version and the second version are different;
  determining that the particular microservice container is up-to-date upon a determination that the first version and the second version are not different; and
  determining that the particular microservice container is out-to-date upon a determination that the first version and the second version are different.

9. The method of claim 8, wherein determining whether the first version and the second version are different further comprises:
  obtaining a first checksum for the first version of the particular microservice container;
  obtaining a second checksum for the second version of the particular microservice container; and
  determining whether the first checksum and the second checksum are different.

10. The method of claim 1, wherein the plurality of version state visualizations further comprises one or more emoticons indicating:
  the one or more up-to-date microservice containers;
  the one or more out-of-date microservice containers; or
  the extent to which the one or more out-of-date microservice containers are outdated.

11. The method of claim 1, wherein the graphical representation of the microservices application further comprises a graphical representation of one or more relationships between the plurality of microservice containers.

12. A system comprising:
  a processor device;
  a memory element; and
  an application manager stored in the memory element, the application manager comprising one or more instructions executable by the processor device, the one or more instructions configured to:
    identify a current implementation of a microservices application, wherein the microservices application comprises a plurality of microservice containers, and wherein each microservice container comprises an environment for executing a particular microservice on the processor device;
    determine version state information for the microservices application, wherein the version state information comprises an indication of:
      one or more up-to-date microservice containers from the plurality of microservice containers;
      one or more out-of-date microservice containers from the plurality of microservice containers; and
      an extent to which the one or more out-of-date microservice containers are outdated;
    display a graphical representation of the microservices application, wherein the graphical representation of the microservices application comprises:
      a graphical representation of the plurality of microservice containers; and
      a plurality of version state visualizations, wherein the plurality of version state visualizations comprises a plurality of graphical indications of: the one or more up-to-date microservice containers; the one or more out-of-date microservice containers; and the extent to which the one or more out-of-date microservice containers are outdated;
prompt a user regarding whether to update the one or more out-of-date microservice containers; and
update the one or more out-of-date microservice containers based on prompting the user.

13. The system of claim 12:
wherein the one or more instructions configured to determine the version state information for the microservices application are further configured to determine that a bug fix update is available for a particular out-of-date microservice container of the one or more out-of-date microservice containers; and
wherein the plurality of version state visualizations further comprises a graphical indication that the bug fix update is available for the particular out-of-date microservice container.

14. The system of claim 12:
wherein the one or more instructions configured to determine the version state information for the microservices application are further configured to determine a risk associated with updating a particular out-of-date microservice container of the one or more out-of-date microservice containers; and
wherein the plurality of version state visualizations further comprises a graphical indication of the risk associated with updating the particular out-of-date microservice container.

15. The system of claim 12:
wherein the one or more instructions configured to determine the version state information for the microservices application are further configured to:
identify a current version number for a particular out-of-date microservice container of the one or more out-of-date microservice containers, wherein the particular out-of-date microservice container is used in the current implementation of the microservices application;
identify an updated version number for an update to the particular out-of-date microservice container; and
determine, based on the current version number and the updated version number, whether the update to the particular out-of-date microservice container comprises a major update, a minor update, or a patch update; and
wherein the plurality of version state visualizations further comprises a graphical indication of whether the update to the particular out-of-date microservice container comprises the major update, the minor update, or the patch update.

16. The system of claim 12, wherein the plurality of version state visualizations further comprises a plurality of colors indicating the extent to which the one or more out-of-date microservice containers are outdated.

17. The system of claim 12, wherein the one or more instructions configured to determine the version state information for the microservices application are further configured to:
identify a first version of a particular microservice container of the plurality of microservice containers, wherein the first version of the particular microservice container is used in the current implementation of the microservices application;
identify a second version of the particular microservice container, wherein the second version of the particular microservice container comprises a latest release of the particular microservice container;
determine whether the first version and the second version are different;
determine that the particular microservice container is up-to-date upon a determination that the first version and the second version are not different; and
determine that the particular microservice container is out-to-date upon a determination that the first version and the second version are different.

18. The system of claim 17, wherein the one or more instructions configured to determine whether the first version and the second version are different are further configured to:
obtain a first checksum for the first version of the particular microservice container;
obtain a second checksum for the second version of the particular microservice container; and
determine whether the first checksum and the second checksum are different.

19. The system of claim 12, wherein the plurality of version state visualizations further comprises one or more emoticons indicating:
the one or more up-to-date microservice containers;
the one or more out-of-date microservice containers; or
the extent to which the one or more out-of-date microservice containers are outdated.

20. A non-transitory computer readable medium having program instructions stored thereon that are executable to cause a computer system to perform operations comprising:
identifying a current implementation of a microservices application, wherein the microservices application comprises a plurality of microservice containers, and wherein each microservice container comprises an environment for executing a particular microservice on one or more processors;
determining version state information for the microservices application, wherein the version state information comprises an indication of:
one or more up-to-date microservice containers from the plurality of microservice containers;
one or more out-of-date microservice containers from the plurality of microservice containers; and
an extent to which the one or more out-of-date microservice containers are outdated;
displaying a graphical representation of the microservices application, wherein the graphical representation of the microservices application comprises:
a graphical representation of the plurality of microservice containers; and
a plurality of version state visualizations, wherein the plurality of version state visualizations comprises a plurality of graphical indications of: the one or more up-to-date microservice containers; the one or more out-of-date microservice containers; and the extent to which the one or more out-of-date microservice containers are outdated;
prompting a user regarding whether to update the one or more out-of-date microservice containers; and
updating the one or more out-of-date microservice containers based on prompting the user.

* * * * *